United States Patent [19]

Kang

[11] Patent Number: 4,975,140

[45] Date of Patent: Dec. 4, 1990

[54] APPARATUS FOR CUTTING GARMENT BELT LOOPS

[76] Inventor: Myung Y. Kang, 4977 Terecita La., La Canada, Calif.

[21] Appl. No.: 285,520

[22] Filed: Dec. 15, 1988

[51] Int. Cl.⁵ .............................................. B32B 31/18
[52] U.S. Cl. ...................................... 156/515; 156/88; 156/251; 112/121.27
[58] Field of Search ................. 156/88, 202, 213, 251, 156/515; 112/121.47

[56] References Cited

U.S. PATENT DOCUMENTS

| | | | |
|---|---|---|---|
| 2,153,351 | 4/1939 | Steinberger | 156/515 |
| 2,328,063 | 8/1943 | Dodge | 156/88 |
| 3,536,568 | 10/1970 | Rothstein | 156/515 |
| 3,640,790 | 2/1972 | Rowley et al. | 156/515 |
| 3,707,419 | 12/1972 | Coburn | 156/88 |
| 4,289,820 | 9/1981 | Blessing | 156/202 |
| 4,388,141 | 6/1983 | Blessing | 156/432 |
| 4,426,241 | 1/1984 | Zimmermann et al. | 156/475 |
| 4,632,047 | 12/1986 | Seaman | 112/121.27 |

Primary Examiner—Caleb Weston
Attorney, Agent, or Firm—Natan Epstein

[57] ABSTRACT

Apparatus for cutting a tape of folded textile fabric containing a continuous strip of fusible material into segments suitable for sewing to a garment as belt loops.

3 Claims, 4 Drawing Sheets

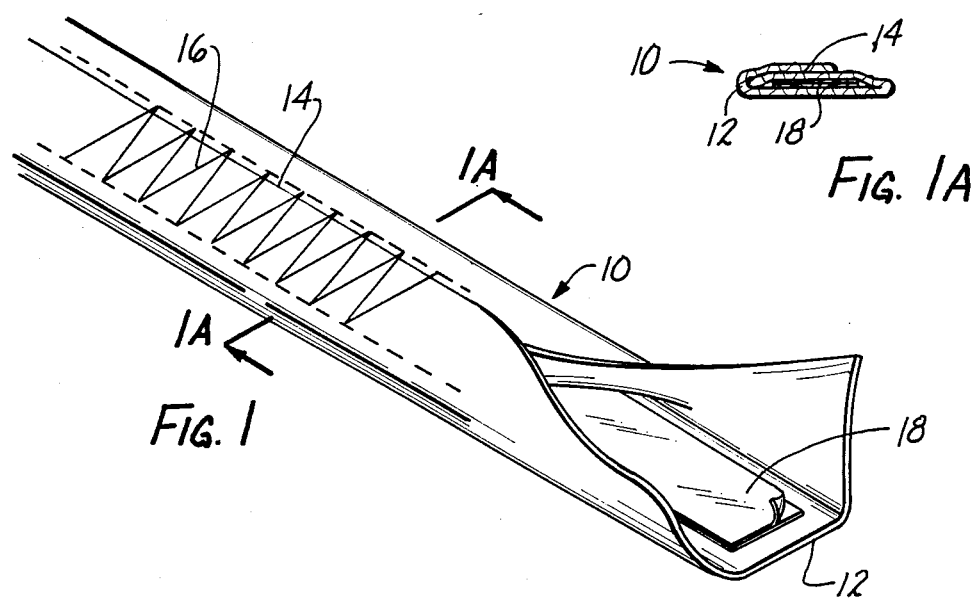
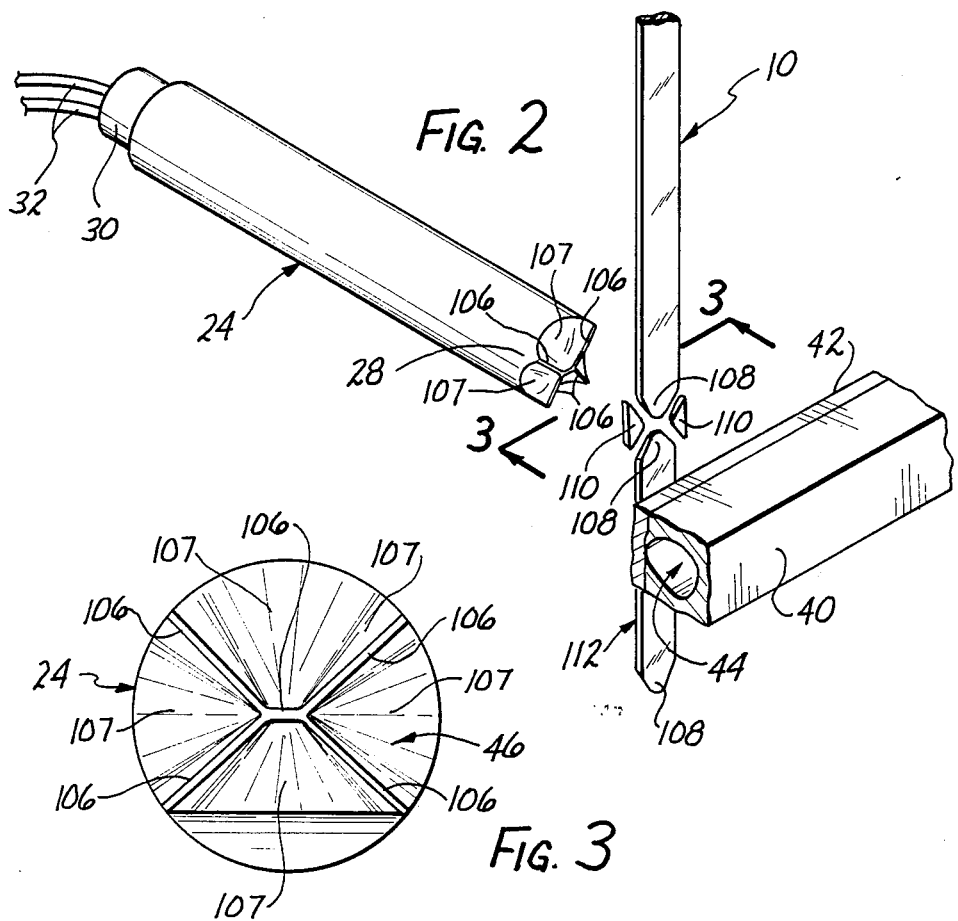

APPARATUS FOR CUTTING GARMENT BELT LOOPS

BACKGROUND OF THE INVENTION

1. Field of the Invention

The present invention is directed to improvements in the efficient manufacture of ready-to-wear garments and more particularly relates to improvements in the manufacture of belt loop strips which are sewn to a garment at the waist band for supporting a belt inserted through the loops. Still more particularly, the improvements relate to the simultaneous cutting and sealing of such strips to prevent unsightly fraying of the textile material at the ends.

2. Field of the Prior Art

It is conventional in the garment industry to make belt loops by folding longitudinally a long strip of fabric, usually the same fabric as used for the rest of the garment whether cotton, wool or synthetic, to make a double thickness flat tape with a longitudinal seam centered on one side of the tape. The seam is stitched closed on a specialized sewing machine in long continuous lengths. These lengths of tape are then fed into a second specialized machine designed to cut this tape at a high rate of speed into relatively short strips of suitable length for subsequent sewing to the garment in the form of belt loops. Typically, the ends of these strips are folded under at each end and sewn to the outside of the garment's waistband. The ends of the belt loops in mass manufactured lower cost garments are left unfinished since considerable time and labor would be involved in sewing closed the ends of the belt loop strips. As a result, it is common that after some wear and machine washing of these garments, such as jeans, the ends of the belt loops become frayed and the fabric fiber unravels in unsightly clumps of loose fibers.

The problem of sealing the edges of cut textile fabric has been addressed in the past and various solutions proposed. It is well-known in the industry to seal the edges of textile materials having at least some thermoplastic fiber content by means of ultrasonic cutting and sealing heads such as for example, are disclosed in U.S. Pat. Nos. 4,610,750 issued to Mango, 4,496,407 to Lowery, Sr. et al., or 4,500,372 issued to Mion. The use of heat sealing and cutting elements is also known as exemplified in U.S. Pat. No. 4,,699,670 to Mims.

The problem of simultaneously cutting and sealing thermoplastic sheets is discussed in U.S. Pat. Nos. 4,767,482 to Diez et al., 4,545,844 issued to Buchanan, and 4,619,102 to Gesinger. Applicant is further aware of U.S. Pat. Nos. 3,828,367 to Bourgeois, 4,244,773 to Siebeck et al., and 4,332,637 to Miller.

The use of ultrasonic cutting heads is not effective with natural fiber fabrics and particularly with heavy cotton denim commonly used in the manufacture of jeans and other low cost garments. Likewise, mere application of heat is ineffective with such fabrics since typically they do not contain thermoplastic fibers.

Zimmerman et al., U.S. Pat. No. 4,426,241 shows a belt loop fabricating machine which cuts and seals loops of fabric by using a separate blade element and an ultrasonic cold welding head.

A continuing need exists for a relatively simple and economical but efficient method for simultaneously cutting and sealing belt loop strips made of a variety of textile fibers and particularly natural fibers such as cotton denim.

SUMMARY OF THE INVENTION

The present invention responds to the aforementioned need by providing a method and apparatus for making belt loop strips with ends sealed against unraveling and fraying.

According to this invention, belt loop strips are prepared by first making a relatively long tape of folded textile fabric containing a strip of fusible thermoplastic material extending approximately the full inner width of said tape, and then applying a combination of heat and pressure to the tape within narrowly defined spaced apart regions transverse to the tape, the tape separating at these regions into segments suitable for sewing to a garment as belt loops. The degree of heat applied is sufficient to burn through said textile material by locally carbonizing but not flaming the textile fibers and to locally fuse the enclosed strip thermoplastic material to the severed ends of the textile fibers at each end of the strips such that the severed fibers are bound against unraveling and fraying.

The application of heat is preferably accomplished by pressing a heated tool against a heated anvil surface with the tape position therebetween. The tool has an operative end configured for confining the heat and pressure to a narrowly defined area of the textile fabric. The force or contact pressure of the heated tool against the fabric is such as to cause mechanical separation of the tape in the carbonized region but limited such that no siginificant cutting of the tape will occur in the absence of heat. The tape is prepared by providing a long strip of a suitable textile fabric, superposing a long strip of the fusible material on one surface of the tectile fabric, folding the textile fabric to cover the fusible material, and sewing closed the folded textile fabric to enclose the fusible material.

A machine according to this invention for cutting a tape of folded textile fabric containing a continuous strip of fusible material into segments suitable for sewing to a garment as belt loops has cutting and sealing elements for applying simultaneous heat and pressure to the tape within a narrowly defined area, with heat sufficient to burn through the textile material and fuse the thermoplastic material to fibers of the textile fabric immediately adjacent the narrowly defined area; and a mechanism for transporting the tape in relation to cutting elements so as to sequentially sever the tape at successive spaced apart locations into the desired segments in which severed fibers are bound by the fused thermoplastic against unraveling. The cutting elements include a heated tool with an operative end configured for confining the heat and pressure to narrowly defined areas of the textile fabric by limiting contact between the operative end of the tool and the textile fabric to one or more narrow ridges on the operative end, which ridges are substantially blunt and generally ineffective for cutting the tape in the absence of sufficient heat. The cutting elements also include a heated anvil surface with the tape positioned between the tool and anvil surface. The anvil surface is preferably heated to a temperature generally near the temperature of the operative tool end.

A machine is disclosed for cutting prefabricated tape into belt loop segments according to this novel process. The machine includes a tape transport arrangement for feeding measured lengths of the tape to a heat cutting head system. A sequencing and timing arrangement controls the operation of the machine in alternating tape feed and tape cut cycles. The machine can be conveniently implemented with small penumatic actuators interconnected for cycling through the sequence of operations in cooperation with a single electric motor which drives the tape transport mechanism.

BRIEF DESCRIPTION OF THE DRAWINGS

FIG. 1 is a perspective view illustrating the tape material used according to this invention for making the belt loops showing the enclosed fusible strip;

FIG. 1a is a transverse section taken along line 1a—1a in FIG. 1;

FIG. 2 is a perspective view illustrating the composite tape being cut into short segments between the hot cutting head and anvil;

FIG. 3 is an end view of the operative end of the hot cutting head, taken along line 3—3 in FIG. 2, showing the narrow contact surfaces separated by concave scalloped surfaces;

DETAILED DESCRIPTION OF THE PREFERRED EMBODIMENTS

Figure 4:
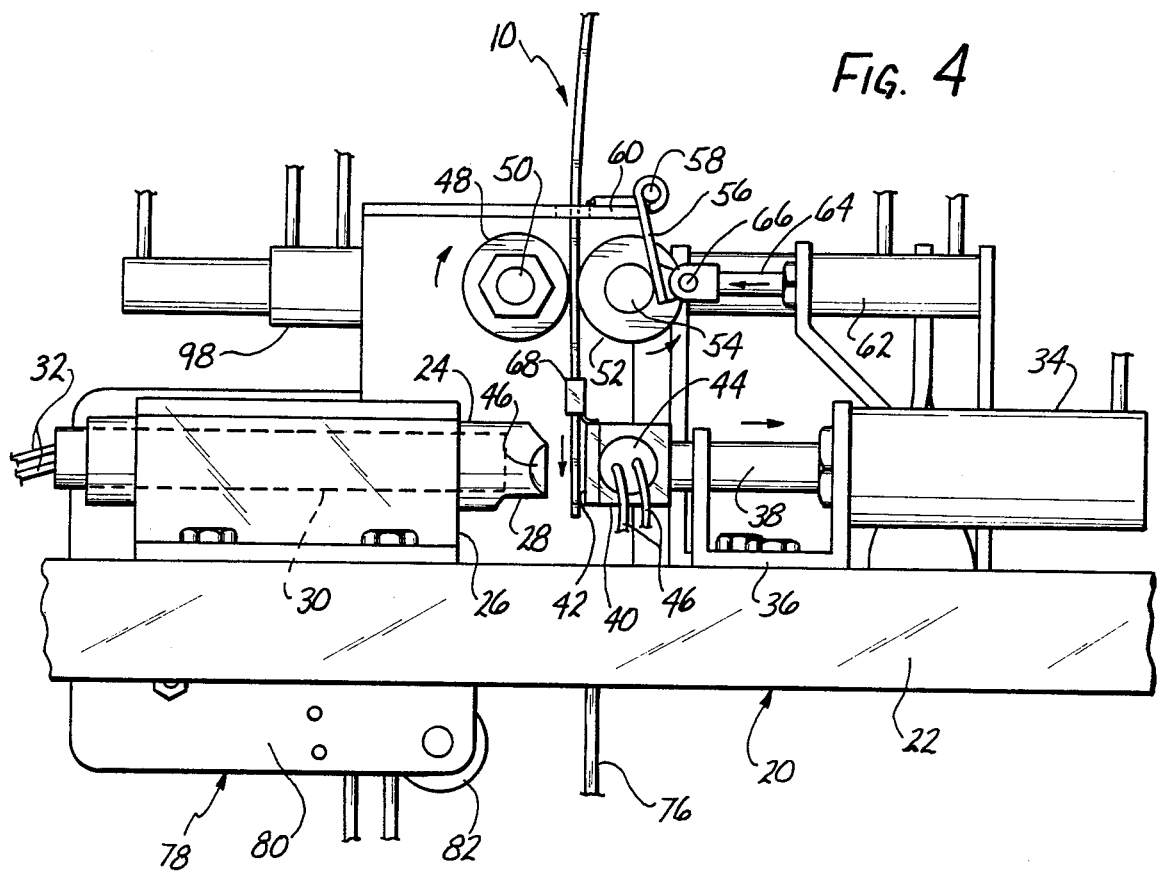
FIG. 4 is a front elevational view of a machine for cutting and sealing belt loop segment according to this invention shown in the tape feed cycle.

With reference to the drawings, FIGS. 1 and 1a show the tape 10 which is to be cut into short segments suitable for sewing to garments as belt loops. The tape 10 consists of an outer fabric 12 which is folded, as best understood from FIG. 1a, to make a longitudinal lap seam 14 on one side of the tape 10 which is closed by stitching 16 along the seam length. Within the folded outer fabric 12 is a strip 18 of low temperature fusible polyester sheet material, commonly known in the garment industry as "fusing", which extends the length of the tape 10 and approximately the full interior width of the tape. The outer fabric 12 is usually selected to match the particular garment to which the belt loop will be sewn and may consist of a wide variety of textile or non-textile materials and in particular may be cotton denim such as is commonly used in the manufacture of jean trousers. The present invention is particularly useful with heavier fabrics such as cotton twills and cotton denims which have a greater tendency to fray at unfinished edges.

Turning to FIG. 4, previously fabricated tape 10 is fed from a suitable supply (not shown) to the cutting-/sealing machine 20 which includes a base 22 to which are mounted the various components of the machine. A cutting tool 24 is bolted to the base 22 by means of a mounting bracket 26. The tool 24 is a hollow cylindrical metallic element with an operative end 28. An electrical resistance heater 30 is fitted within the tool 24 and is powered through electric conductors 32 extending from the opposite or rear end of the tool 24. A penumatic actuator 34 fixed to the base 22 by means of a supporting bracket 36. The actuator 34 drives a rod 38 which carries an anvil block 40 including a anvil face 42 axially opposite the operative end 28 of the heated tool 24. An electric resistance heater 44 is fitted into a cylindrical cavity in the anvil block 40 and is powered through electrical supply conductors 46. The cutting tool 24 is stationary relative to the base 22 while the anvil block 40 is movable axially with the actuator arm 38 between the retracted position shown in FIG. 4 and an extended position wherein the anvil face 42 is driven against the end face 46 of the cutting tool 24.

The tape 10 is fed between a pair of driving rollers which include a roller 48 supported on a fixed axle 50 and a movable roller 52 rotatable about axle 54 which is supported on carrier 56 which is hinged at 58 to a stationary supporting structure 60. An actuator 62 drives an arm 64 connected at 66 to a free end of the carrier 56. The actuator 62 drives the arm 64 between the extended position shown in FIG. 4 and a retracted position (not shown) wherein the roller 52 is spaced away from roller 48. In the driving or extended position, the carrier 56 pivots to advance the roller 52 into engagement with the fixed roller 48 with the tape 10 pressed between the two rollers as shown in FIG. 4. The stationary roller 48 is continuously driven for rotation in a clockwise sense and when the tape 10 is pressed between the two rollers it is pulled downwardly into the machine through a feed guide 68 which positions the tape between the cutting tool end face 46 and the anvil face 42, as shown in FIGS. 2 and 4.

Figure 5:
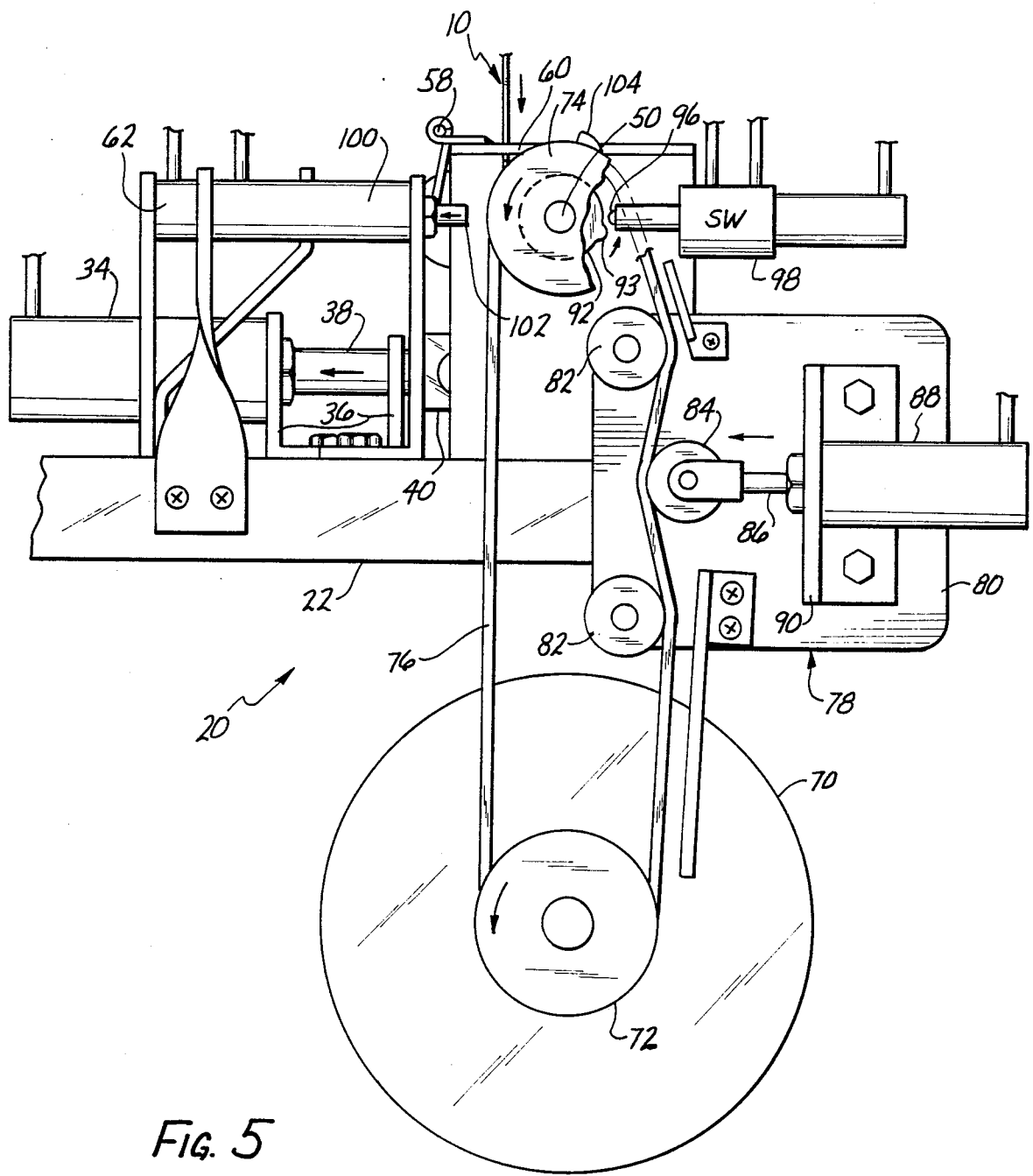
FIG. 5 is a rear elevational view of the machine of FIG. 4 showing the motor driven tape transport and penumatic actuators during the tape feed cycle.
Figure 6:
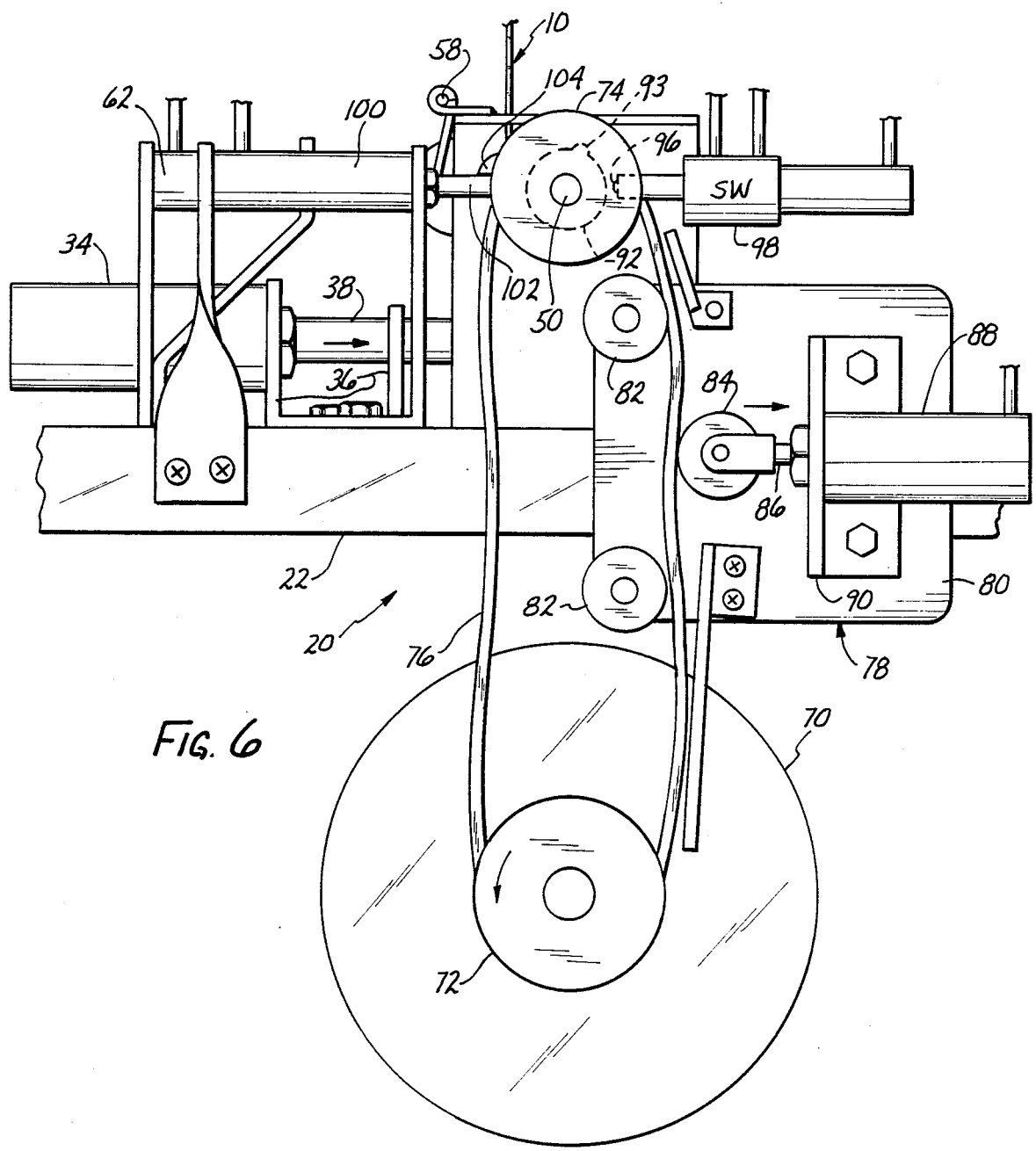
FIG. 6 is a view as in FIG. 5 with the machine in the cutting cycle with the tape transport disengaged and the tape cutting head actuated.

FIGS. 5 and 6 show the rear side of the cutting/sealing machine 20, where an electric motor 70 turns a driving pulley 72 which is linked to a driven pulley 74 by a drive belt 76. The driven pulley is mounted on the same shaft 50 as the driving roller 48 in FIG. 4. A belt tensioning assembly 78 is supported on a mounting plate 80 fixed to the base plate 22 and includes a pair of idler wheels 82 and a tensioning wheel 84 mounted on the free end of an arm 86 movable axially by actuator 88 which is fixed to the plate 86 by a bracket 90. The tensioning wheel 84 is movable by the actuator 88 between a driving position shown in FIG. 5 and an idling position shown in FIG. 6. In the driving position of FIG. 5 the wheel 84 is advanced against the belt 76 between the idler wheels 82 thereby taking up slack in the drive belt 76 and bringing the belt into positive frictional driving engagement with both the driving pulley 72 and driven pulley 74 which then drives the roller 48 and feeds tape 10 to the machine. The tensioning wheel 84 can be retracted as in FIG. 6 away from the belt 76 to release tension on the drive belt 76 therbey disengaging the driven pulley 74 from the driving pulley 72 while the belt is slack, to stop movement of the tape 10.

A cam wheel 92 is fixed to the shaft 50 with the driven pulley 74. The cam wheel cooperates with a cam follower 96 which actuates a switch 98.

The machine 20 operates in two cycles, a feed cycle wherein the tape transport mechanism feeds a pre-determined length of tape 10 past the end face 46 of the cutting tool 24, and a cutting cycle during which the tape transport is disengaged to hold the tape 10 stationary and a tape segment is cut off by pressing the anvil face 42 against the cutting face 46. The two cycles are repeated consecutively by the machine 20 at a rate determined by the cam 92 and cam follower switch 98.

Figure 7:
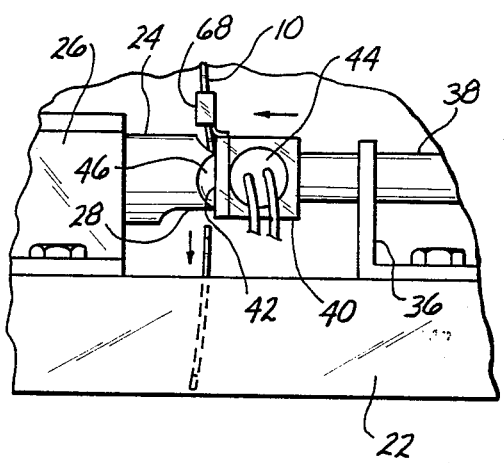
FIG. 7 is an fragmentary view taken as in FIG. 4 but showing the hot cutting head in operation during the tape cutting cycle.

The sequence of operation of the machine will now be described. In a starting condition shown in FIGS. 4 and 6, the anvil face 42 is retracted away from the cutting face 46 and the tensioning wheel 84 is retracted to disengage the tape drive system. The electric motor 70 is running and continuously turns the drive pulley 72 in a counter clockwise direction indicated by the arrow in FIGS. 5 and 6. The actuator arm 86 is advanced by actuator 88 urging tensioning wheel 84 against the drive belt 76 to transmit rotation of the driving pulley 72 to driven pulley 74 which turns the axle 50 and the friction wheel 48. The actuator 62 in FIG. 4 advances its arm 64 which causes the idler wheel 52 to press the tape 10 against the driven wheel 48, feeding the tape 10 through the guide 68 downwardly between the anvil face 42 and cutting face 46. The length of tape 10 fed into the machine is determined by the time of rotation of the cam element 93 on the cam wheel 92. This cam element urges the cam follower 96 away from the wheel to trip switch 98 which through appropriate logic sequencing connections and elements causes actuator 88 to retract the wheel 84 thereby disengaging the drive belt from axle 50. Rotational inertia of the wheel 74 causes the wheel and axle 50 to continue turning some distance. An actuator 100 also activated in response to the tripping of switch 98 extends its actuator arm 102 from the retracted position in FIG. 5 to the extended position in FIG. 6, into the path of a stop element 104 on pulley 74 so that the wheel 74 and shaft 50 are stopped positively and consistently at a given position as shown in FIG. 6, thus determining the length of tape 10 fed past the cutting face 46. The cutting actuator 34, seen in FIG. 4 is tripped with a slight delay relative to actuator 100 so that once the tape movement past the cutting face 46 has been brought to a positive stop, the anvil face 42 is advanced by actuator arm 38 so as to firmly press the tape 10 against the cutting face 46 as shown in FIG. 7. After a timed interval the anvil block 40 is retracted by actuator 34, freeing the tape 10 so that the cut-off segment drops away through an opening in base 22. At the same time actuator 100 retracts to free the pulley 74 and actuators 62 and 68 advance to tension the drive belt 76, turning the pulley 74 along with axle 50 and tape feed wheel 48, with the tape 10 being pressed by idler 52, so that a fresh length of tape is fed towards the cutting head until the cam 93 again actuates switch 98 to disengage the drive belt and actuate the cutting head, thus repeating the sequence of operations.

The geometry of the cutting face 46 is best understood by turning by reference to the perspective view of FIG. 2 and the end view of FIG. 3. The cutting element 24 is a metallic tube closed at one end by the end face 46 which is shaped and scalloped to define projecting raised ridges which in the particular embodiment illustrated define an X-shape. The ridges are blunt ended in that they terminate in substantially flat eneded surfaces 106 which are of narrow but significant width, e.g. between 1/64 and 1/32 inches wide, and which lie within a common plane perpendicular to the axis of the cutting element 24 and parallel with the anvil face 42. The side edges of the flat end surfaces 106, i.e. the transition from the contact surfaces to the concave curved surfaces 107 may advantageously be fairly sharp, but the end surfaces facing the tape 10 are plane and of significant width. The cutting face 46 is maintained at an operating temperaure of approximately 900 degrees Fahrenheit by the resistance heater 30 while the anvil face 42 is also heated to a generally similar temperature which may, however, be somewhat lower than that of the cutting face 46.

During the cutting cycle, the anvil face 42 presses the tape 10 against the blunt edges 106 of the cutting face 46. The cutting face 46 is sufficiently scalloped so that application of the high heat is limited to the narrowly defined area of the tape 10 actually contacted by the cutting edges 106. The heat applied by the edges 106 is sufficiently high to carbonize the textile fibers coming into actual contact with the edges 106. The carbonized portions of the textile fbers are weakended and breakoff under pressure of the edges 106. The edges 106 advance through the tape 10 until they are stopped by contact with the anvil face 42, cutting the tape 10 in an X pattern shown in FIG. 2, yielding pointed ends 108 and two small scrap triangular pieces 110. The segment 112 cut-off from the tape 10 drops away from the anvil face through an underlying opening in the base plate 22 and into a collecting receptacle provided for the purpose.

The combination of high temperature of the cutting face 46 with the relatively blunt contact surfaces 106 result in relatively slow cutting of the tape 10 which allows time for heat transfer to portions of the tape immediately adjacent to the cut edges. The fusible material 18 contained in the tape 10 melts under this heat and is pressed into the severed fiber ends along both edges created by the cutting face 46, sealing both ends of the cut segment 112. The molten fusing material forms a matrix which solidifies and holds the textile fibers to prevent unraveling and fraying of the cut ends of the tape segment 112. The cutting of the tape 10 is actually done by a pyrolitic proces of the contact surfaces 106 against the tape 10. The combination of the width of the edges 106 and the force applied by the anvil face 42 against the tape 10 are such that no cutting of the tape 10 occurs if the cutting face 46 is not heated to its normal operating temperature. In other words, the cutting action of the face 46 and edges 106 are not a mechanical cutting such as would be effected by sharp knifelike edges on the cutting face, but rather by the burning or carbonizing action of hot, relatively blunt edges or ridges 106 in combination with moderate force applied to the tape by the actuator driven anvil face 42. Heat transfer from the cutting face 42 to the portions of the tape 10 immediately adjacent the edges cut by the ridges 106 may be facilitated by appropriate contouring or shaping of the scallop cavities 107 of the cutting face 46 lying between this legs of the X configuration. If the scallop surface 107 is made to fall away sharply from the flat end surface 106 the effect will be to diminish the heat transfer to the fabric immediate adjacent the contact edge 106. Conversely, relatively gentle sloping of the face surface adjacent to the contact ridges 106 will result in more heat being transfered by radiation, conduction or both to the fabric immediately adjacent the contact areas 106, but because of the recessed relationship of these adjacent surfaces 107 the heat transfer to the tape will be reduced below the level necessary to carbonize or burn the fabric but still be sufficiently high to assist in melting the fusible material 18. This fusing strip 18 is melted only near the severed ends 108 of each segment 112 cut by the machine, but retains its integrity separate from the outer fabric 12 between these two ends so that the flexibility, appearance, and other desirable characteristics of the outer fabric 12 are not altered throughout the intermediate portion of the segment 112, which is the portion of the belt loop which remains visible after the ends 108 have been folded under and sewn to a garment.

The X-shaped pattern of the cutting ridges 106 on the cutting face 46 in FIGS. 2 and 3 is by way of example only and the present invention is readily adapted to other cutting face geonetries, in particular a straight edge extending diametrically across the end face 46 to obtain straight-cut ends on the segments 112. The aforementioned temperatures of the elements 24 and 40 have been found to work well with natural fiber cotton denim fabric of the type commonly used for making blue jeans and similar trousers. The length of the segments 112 cut by the machine 20 are adjustable by changing one or more dimensions of the various drive components. For example, altering the diameter of the driven wheel 48, all other factor equal, will result in a change in the length of the segment 112.

All actuators shown and described as part of the machine 20 are commercially available penumatic piston actuators. The actuators are shown each with two corresponding penumatic pressure lines connected to the actuator cyclinders, but for simplicity and clarity the lines are broken off and the interconnections are not shown in the drawings. It will be understood however that the various actuators are supplied form a conventional source of penumatic pressure through interconnecting lines and circuits which will be readily apparent to those possessed of ordinary skill in the art and are therefore not described in detail here.

While a particular embodiment of the invention has been illustrated and described for purposes of clarity and example, it must be understood that many changes, substitutions and alterations to the described embodiment will become apparent to those possessed of ordinary skill in the art in light of the foregoing description without thereby departing from the scope and spirit of this invention which is defined only by the following claims.

What is claimed is:

1. Apparatus for cutting a tape of folded textile fabric containing a continuous strip of fusible material into segments suitable for sewing to a garment as belt loops, comprising:
    a tool terminating in an end face including one or more narrow ridges on said end face, each ridge presenting a substantially blutn ridge end surface between relatively sharp ridge edges such that the ridges are generally ineffective for cutting said tape in the absence of heat;
    means for heating said end face to a temperature sufficient for cabonizing fibers of the textile fabric to be cut;
    means for pressing said end face against said tape thereby applying simultaneous heat and pressure to said tape at areas contacted by said ridge end surfaces to burn through said textile material and fuse said thermoplastic material immediately adjacent said ridge end surfaces to severed fibers of said textile fabric;
    said end face being shaped and configured to recede gradually from said ridge edges for applying reduced heat to a portion of the tape adjacent to that contacted by said ridge end surface thereby to ensure fusing of said thermoplastic material near the severed end of the tape; and
    drive means for transporting said tape in relation to said first means so as to sequentially sever said tape at successive spaced apart locations into said segments wherein severed fibers are bound against unraveling.

2. The apparatus of claim 1 wherein said tape is positioned between said heated tool and an anvil surface.

3. The apparatus of claim 2 further comprising means for heating said anvil surface to a temperature generally near the temperature of said end face.

* * * * *